United States Patent [19]

Kurauchi et al.

[11] Patent Number: 4,486,373
[45] Date of Patent: Dec. 4, 1984

[54] METHOD FOR PRODUCING REINFORCED THERMOPLASTIC RESIN COMPOSITION

[75] Inventors: Toshio Kurauchi, Nagoya; Hidero Takahashi, Aichi; Shigeyuki Sato, Toyota; Makoto Murase; Minoru Takahara, both of Nagoya; Tamio Ohi, Okazaki; Takaki Kamio, Toyota, all of Japan

[73] Assignees: Kabushiki Kaisha Toyota Chuo Kenkyusho, Aichi; Aisin Seiki Kabushiki Kaisha; Aisin Kako Kabushiki Kaisha, both of Kariya, all of Japan

[21] Appl. No.: 488,529

[22] Filed: May 3, 1983

Related U.S. Application Data

[62] Division of Ser. No. 320,526, Nov. 12, 1981, abandoned.

[30] Foreign Application Priority Data

| Nov. 18, 1980 | [JP] | Japan | 55-162326 |
| Nov. 26, 1980 | [JP] | Japan | 55-166128 |
| Nov. 26, 1980 | [JP] | Japan | 55-166129 |
| May 29, 1981 | [JP] | Japan | 56-83348 |
| Jun. 10, 1981 | [JP] | Japan | 56-89224 |
| Jul. 15, 1981 | [JP] | Japan | 56-110288 |

[51] Int. Cl.$^3$ .............................. B02C 41/44
[52] U.S. Cl. ............................ 264/142; 264/137; 264/174; 264/211
[58] Field of Search .............. 264/141–143, 264/137, 174, 328.18, 211; 523/205–209

[56] References Cited

U.S. PATENT DOCUMENTS

| 2,877,501 | 2/1959 | Bradt | 264/143 |
| 3,233,025 | 2/1966 | Frye et al. | 264/143 |
| 3,326,827 | 6/1967 | Mullin | 523/205 |
| 3,671,378 | 6/1972 | Baer et al. | 523/209 |
| 3,766,135 | 10/1973 | Yamanouchi et al. | 523/209 |
| 3,899,462 | 8/1975 | Mewbould et al. | 523/208 |
| 3,923,947 | 12/1975 | Cook | 264/141 |
| 3,932,347 | 1/1976 | Camelon et al. | 523/209 |
| 3,943,090 | 3/1976 | Enever | 523/207 |
| 4,144,302 | 3/1979 | Calkin | 264/142 |
| 4,205,030 | 5/1980 | Menshutine | 264/141 |
| 4,252,696 | 2/1981 | McQuarrie | 264/137 |
| 4,338,233 | 7/1982 | Das et al. | 523/206 |

FOREIGN PATENT DOCUMENTS

| 3024608 | 1/1982 | Fed. Rep. of Germany | 523/205 |
| 51-1346 | 1/1976 | Japan | 523/205 |
| 1067940 | 5/1967 | United Kingdom | 523/205 |

Primary Examiner—Jay H. Woo
Assistant Examiner—Timothy W. Heitbrink
Attorney, Agent, or Firm—Oblon, Fisher, Spivak, McClelland & Maier

[57] ABSTRACT

A reinforced thermoplastic resin composition comprising a thermoplastic resin, a fibrous, flaky or powdery inorganic reinforcing material, and an uncured, thermally curable resin, such as a thermosetting resin, applied to the surfaces of the inorganic reinforcing material. Molding of this composition by injection molding or the like yields a molded product in which the thermally curable resin has been cured by the heat during the molding to provide a strong chemical bond between the inorganic reinforcing material and the thermoplastic resin. The molded product thus obtained possesses more strength and/or elongation than the conventional thermoplastic resin product.

8 Claims, 3 Drawing Figures

METHOD FOR PRODUCING REINFORCED THERMOPLASTIC RESIN COMPOSITION

This application is a Division, of application Ser. No. 320,526, filed Nov. 12, 1981 now abandoned.

BACKGROUND OF THE INVENTION

1. Field of the Invention

This invention relates to a reinforced thermoplastic resin composition for providing a molded product having excellent mechanical strength.

2. Description of the Prior Art

As is well known, a composite material comprising a resin, and a fibrous substance such as glass, carbon, boron or metal fibers, or a flaky or powdery substance such as mica or talc, is widely used for making electrical, automobile, or other parts.

Substantially in accordance with a simple law of complexing, a composite material composed of a thermosetting resin and long fibers exhibits excellent mechanical properties which are better than those of a metallic material. Accordingly, it has come to be used for the manufacture of the wing and empennage of an aircraft, or other parts for which the maintenance of safety is a critical factor. It is presumed that the outstanding mechanical properties of these materials are due to the strong interface formed by the reaction between the thermosetting resin as the matrix, and a surface treating agent, such as an organofunctional silane, on the fibers.

A composite material composed of a thermoplastic resin and short fibers, or a flaky or powdery substance, however, exhibits only an extremely lower degree of mechanical properties than those obtained in accordance with a simple law of complexing, as opposed to the composite material containing a thermosetting resin. The composite material composed of a thermoplastic resin, and short fibers, or a flaky or powdery substance, however, is suited for mass production, and is used in a lot of fields, including the automobile and electrical industries, since it is manufactured by injection molding, while the composite material composed of a thermosetting resin and long fibers is mainly formed by a press, or the like.

It has recently been desired to make important functional parts of a resin in order to save resources and energy. No thermoplastic composite material known in the art has, however, been satisfactory in view of the performance required thereof, and it has been expected to develop a stronger thermoplastic composite material.

SUMMARY OF THE INVENTION

The present invention overcomes the aforesaid drawbacks.

It is, accordingly, an object of the present invention to provide a novel reinforced thermoplastic resin composition ensuring a rigidly bonded interface between a thermoplastic resin as a matrix and an inorganic reinforcing material.

It is another object of the present invention to provide a novel reinforced thermoplastic resin molding in which thermally curable resin is chemically united and integrated between the thermoplastic resin and the inorganic reinforcing material, thus having more strength and/or elongation than has heretofore been attainable.

It is a further object of the present invention to provide a novel reinforced thermoplastic resin molding suited for mass production.

Glass fibers, which are often used as typical reinforcing fibers, have their surfaces covered with a film forming agent, a coupling agent, a lubricant, etc. A coupling agent serving to combine with the matrix, for example, an organofunctional silane, is used only in the quantity which is equal to about one-tenth of that of the film forming agent, since it is very expensive. If the matrix is a thermosetting resin, it reacts more actively and organically with an organic group in an organofunctional silane, such as an epoxy, amino or vinyl group, and consequently provides a good composite material. On the contrary, if the matrix is a thermoplastic resin, it is impossible to expect the reactivity as in a thermosetting resin since its molecules are very high. Likewise, there exists a problem in the compatibility between the matrix and the coupling agent.

The inventors of this invention have considered these points and have accomplished the present invention by finding that a thermoplastic composite material having outstanding mechanical properties can be obtained by employing a thermally curable resin in the interface between the matrix and the inorganic reinforcing material for bonding them together. Namely, a reinforced thermoplastic resin composition according to this invention comprises a fibrous, flaky or powdery inorganic reinforcing material, an uncured, thermally curable resin component adhering to the surface of the reinforcing material, and a thermoplastic resin component enclosing the reinforcing material integrally therein.

When the reinforced thermoplastic resin composition of this invention is molded by an injection molding machine, or the like, it is possible to obtain a molding of high strength, since the dispersion of the inorganic reinforcing material and the reaction of the thermally curable resin with the thermoplastic resin and with the inorganic reinforcing material take place almost simultaneously.

The inorganic reinforcing material to be used in this invention includes fibers such as of glass, metal, carbon, boron or silicon carbide, or flakes such as of mica, vermiculite or talc, or powder such as of clay or glass beads. It is possible to use commercially available glass fibers in the form of roving or the like. It is preferable to use a roving treated only with a few kinds of surface treating agents, or only with a silane coupling agent, a lubricant and an antistatic agent.

It is possible to use any conventionally known coupling agent such as a silane or titanium coupling agent. Although it is often the case that a film forming agent and a lubricant are used with the coupling agent, they are not essential to the composition of this invention, but are only required for the spinning and winding of fibers. The proportion of the coupling agent is in the range of 0.01 to 2 parts by weight, or more preferably 0.2 to 0.5 part by weight, per 100 parts by weight of the inorganic reinforcing material. It is preferable for the coupling agent to cover the entire surface of the fibers.

As for a thermoplastic resin, it is possible to use any conventional one such as polyamide, thermoplastic polyester, polyoxymethylene, polyolefin, or ABS, or a mixture thereof.

The polyamide resin means a polymer or copolymer such as ε-caprolactam, 6-amino caproic acid, ω-naphtholactam, 7-aminoheptanoic acid or 11-aminoundecanoic acid; a polymer or copolymer obtained by polycondensation of a diamine such as hexamethylenediamine, nonamethylenediamine, undecamethylenediamine, dodecamethylenediamine or metaxylylenediamine, and a dicarboxylic acid such as terephthalic acid, isophtalic acid or adipic acid. It is also possible to use a mixture of a polyamide resin with another resin, if it contains at least 50% by weight of the polyamide resin.

The thermoplastic polyester is a product of polycondensation or copolycondensation between a glycol derivative such as ethylene glycol, 1, 3-propylene glycol or 1,4-butadiene glycol, and a dibasic acid such as terephthalic acid, isophthalic acid or maleic acid. According to this invention, it is usual to employ, among others, polyethylene terephthalate or polybutylene terephthalate. It is also possible to use a mixture of a thermoplastic polyester with another resin, if it containes at least 50% by weight of the thermoplastic polyester.

It is possible to incorporate any additive, such as a filler, a pigment, an ultraviolet absorber or an antioxidant, into the thermoplastic resin if required.

The thermally curable resin includes a thermosetting resin and a thermally curable rubber. The content of the thermally curable resin is in the range of 0.03 to 20 parts, or more preferably 0.3 to 2 parts, per 100 parts by weight of the inorganic reinforcing material. It is desirable for the inorganic reinforcing material to have a surface covered with a layer of an uncured, thermally curable resin. If it has been cured, it is impossible to obtain any molding of high strength, since no satisfactory dispersion or splitting of the inorganic reinforcing material takes place.

It is possible to use any conventionally known uncured, thermally curable resin such as an epoxy, urethane, polyester, melamine or phenolic resin.

The epoxy resin is a resin obtained by reaction of a principal agent having an epoxy group with a curing agent, and having a three-dimensional network structure. Examples of the principal agent include: a polyglycidyl ether obtained by reaction in the presence of a basic catalyst of a polyhydric alcohol such as bisphenol A, halogenated bisphenol A, resorcinol or catechol, and epichlorohydrin; a polyglycidyl ester obtained from an alkali salt of a polybasic aromatic carboxylic acid or a cycloaliphatic carboxylic acid, and epichlorohydrin; an epoxy-novolac resin obtained by condensation between a novolac type phenolic or cresol resin, etc. and epichlorohydrin; an olefin or vegetable oil epoxidized by peroxidation, and a nitrogen-containing heterocyclic epoxy resin obtained from epoxy isocyanurate, a hydantoin or imidazoline derivative, or the like. It is possible to use any other material, but it is important to select an appropriate material, since the choice of the principal agent for an epoxy resin has a significant bearing on the mechanical properties of any molded product that may be eventually obtained.

A polyglycidyl ester modified with a dimer acid, and sold by Shell Chemical under the trade name EPIKOTE 871 or 872 is, for example, useful for general purposes.

As the curing agent, it is possible to use, for example: various kinds of amine derivatives including an aromatic diamine such as diaminodiphenylmethane, diaminodiphenylsulfone or metaphenylenediamine, an alicyclic amine such as 4-amino-2,2,6,6-tetramethylpiperidine, and a modified amine such as N,N'-di($\beta$-cyanoethyl)-hexamine; an acid or acid anhydride such as phthalic acid, maleic acid, pyromellitic acid, phthalic anhydride, maleic anhydride, dodecylsuccinic anhydride, methylnadic anhydride, methyltetrahydrophthalic anhydride, or pyromellitic anhydride; or a low molecular polyester obtained by polycondensation of an acid and glycol.

The proportions of the principal and curing agents in an epoxy resin may be in the range in which the quantity of the curing agent is at least equal to the stoichiometric amount obtained from the epoxy equivalent of the principal agent.

The uncured rubber comprises a liquid polymer having a functional group at each end of a molecule, and a chain extender. This liquid polymer is usually called telechelic polymer.

Examples of the telechelic polymer include 1,4-polybutadiene, 1,4-polybutadiene-acrylonitrile, 1,4-polybutadiene-styrene, 1,2-polybutadiene, chloroprene, and polysulfide. They have a functional group, such as a carboxyl, epoxy, amino or hydroxyl group, at each end. The functional groups at both ends need not be the same, but can be selected appropriately.

Examples of the chain extender include: a diepoxy compound such as a glycidyl ether of glycol or of bisphenol A, or epoxy-novolac; a diaziridinyl compound such as phenylbis[1-(2 -methyl)aziridinyl]phosphine oxide or bis[1-(2-ethyl)aziridinyl]sebacic amide; a diamino compound such as 2,4-diamino-6-undecyl-1,3,5-triazine, diaminodiphenylsulfone or diaminodiphenylmethane; a diisocyanate compound such as toluidine isocyanate or hexamethylene diisocyanate prepolymer; and a dihydroxy compound such as 1,4-butanediol, 2-ethylhexanediol, resorcinol or bisphenol A.

It is preferable for the reinforced thermoplastic resin composition to be in the form of pellets so that it can be used as a molding material for an ordinary molding machine. A powder or mass of the composition can, however, be also employed if a particular molding machine is used.

In the event the inorganic reinforcing material is flaky or powdery, it is mixed with the uncured, thermally curable resin, so that the resin may cover the surface of the reinforcing material. Then, the thermoplastic resin in powdery form is mixed with the mixture of the thermally curable resin and the reinforcing material, whereby a mixed molding material in powdery form is obtained. This mixed powder may be compressed into pellets, while it is not heated.

In the event the inorganic reinforcing material is fibrous, it is preferable for pellets to have a columnar shape in which one or more bundles of fibers are buried axially in the thermoplastic resin. It is preferable for the columnar pellets to have an axial length of several millimeters, and a diameter of about 2 to 6 mm. The thermally curable resin is applied to the surfaces of the fibers beforehand. A method of preparing these columnar pellets will hereunder be described in further detail.

This method comprises the steps of applying a thermally curable resin continuously to the surfaces of reinforcing fibers in the form of roving, successively introducing the roving through a strand guide into a thermoplastic resin in an extrusion molding machine to extrusion mold a resin strand comprising the thermoplastic resin in which the roving is buried, followed immediately by cooling, and cutting the resin strand into pellets.

According to this method, the application of the thermally curable resin to the reinforcing fibers and the formation of a composite are carried out successively. It is, therefore, a very good method for producing a thermoplastic composite material which eliminates the limitation relative to the surface treating agents on a commercially available roving, and permits the use of almost all kinds of organic substances as the surface treating agent.

For the application of the thermally curable resin, it is, for example, possible to dip the roving continuously in a liquid containing the resin, or spray the resin onto the fibers. Any known method of application can be employed as required.

The step of extrusion molding may duplicate any ordinary method of manufacturing a resin coated wire. The thermoplastic resin is coated around the roving (or the roving is buried in the resin) to produce a resin strand. During this step, the roving is introduced through the strand guide into the extrusion molding machine, buried in the resin, and leaves the outlet of a nozzle. It is preferable for this step to be accomplished within one second, or more preferably within 0.2 second. Since during the extrusion molding operation, the thermally curable resin covering the roving is brought into contact with, and heated by the molten resin, it is desirable to shorten the heating time as far as possible in order to minimize the effects of the heat on the thermally curable resin for retaining the uncured state. In this connection, it is desirable to increase the feeding speed of the roving, or shorten the distance between the strand guide and the outlet.

The resin strand leaving the outlet should be cooled rapidly. For this purpose, it is possible to spray cold water onto the strand, or cause it to travel through a bath of water. After the strand has been cooled and solidified, it may usually be cut by a shearing machine into pellets each having a length of about 5 mm.

The aforesaid mixed powder or pellets may be formed in an injection or extrusion molding machine into a molded product having a predetermined shape. In the molding machine, the mixed powder or pellets are heated and melted. The inorganic reinforcing material is uniformly distributed in the molten thermoplastic resin by screw in the molding machine. The thermally curable resin undergoes a thermal curing reaction to yield a high molecular compound having a strong chemical bond between the inorganic reinforcing material and the thermoplastic resin. The molten material is extruded or injected into a mold and cooled therein to provide a molded product.

The molded product thus obtained has a definite shape, and its construction is such that the fibrous, flaky or powdery inorganic reinforcing material is substantially uniformly distributed in the thermoplastic resin, while the thermally curable resin established a chemical bond between the inorganic reinforcing material and the thermoplastic resin integrally therewith. The thermally curable resin serves to impart outstanding degrees of mechanical strength and coating adhesion to the molded product.

It is particularly possible to obtain a molded product of outstanding tensile strength, if the inorganic reinforcing material comprises glass fibers, while the thermoplastic resin is a thermoplastic polyester and the thermally curable resin is an epoxy resin. A molded product of outstanding tensile strength can also be obtained from a combination of glass fibers, polyamide and an epoxy resin. A molded product of improved elongation can be obtained from a combination of glass fibers, polyamide and rubber.

DESCRIPTION OF THE PREFERRED EMBODIMENTS

Having generally described this invention, a further understanding can be obtained by reference to certain specific examples which are provided herein for purposes of illustration only and are not intended to be limiting unless otherwise specified.

Figure 1:
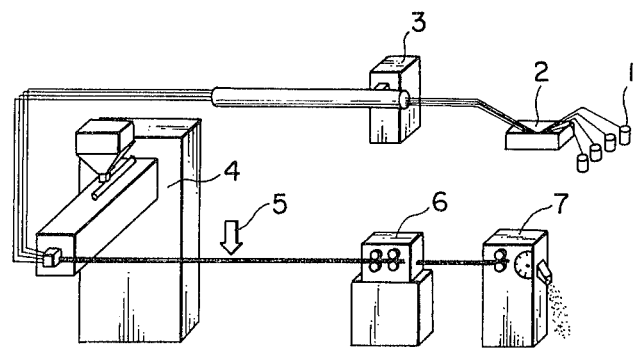
FIG. 1 is a view illustrating a process for producing a fiber reinforced resin composition embodying this invention.

The apparatus employed for the examples is schematically shown in FIG. 1, in which numeral 1 designates a roving feeding device; 2, a vat for adhesive treatment; 3, a drying oven; 4, an extrusion molding machine; 5, cooling water; 6, a take-off unit; and 7, a shearing unit.

EXAMPLE 1

The roving feeding device 1 feeds four rovings of glass fibers having a diameter of $14\mu$ and treated with an aminosilane under the trade name A1100 of Dow Chemical. The rovings were continuously dipped in the adhesive treatment vat 2 containing a solution composed of 1.0 part by weight of an epoxy resin of the bisphenol A glycidylether type under the trade name EPIKOTE 828 of Shell Chemical, 0.34 part by weight of 4,4′-diaminodiphenylsulfone, and 100 parts by weight of acetone, and dried in the drying oven 3. The dipping time was about 0.1 second, and the drying time was from 30 seconds to one minute. The tacky adhesive-coated rovings were introduced into wire coating dies in the extrusion molding machine 4 continuously. Nylon 66 under the trade name LEONA 1300S of Asahi Chemical was supplied through a hopper on the molding machine 4 to coat the rovings.

Figure 2:
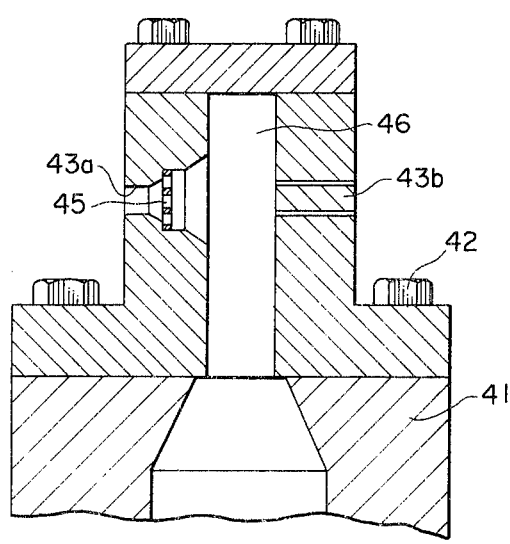
FIG. 2 is a sectional view of the die portion of an extrusion molding machine as employed in the extrusion molding process illustrated in FIG. 1.

FIG. 2 is a sectional view of the die portion of the molding machine. The extrusion molding machine 4 comprises an ordinary extrusion molding unit 41, of which only the molten resin outlet is shown, a die 43 secured to the outlet of the molding unit 41 by bolts 42, and having a nozzle 43a and a strand guide 43b, and a spacer guide 45 mounted across the inner wall defining the nozzle 43a. The die 43 is provided centrally with an open space 46 into which the molten resin is received. The nozzle 43a has the shape of a funnel connected with the open space 46. The nozzle 43a includes an inclined wall portion formed with a shoulder against which the spacer guide 45 is secured. The spacer guide 45 is centrally provided with a guide hole, and is also formed adjacent to its periphery with four holes defining passages for the resin. The strand guide 43b has four small through holes. The four rovings pass therethrough, and through the guide hole in the spacer guide 45, and leaves the nozzle 43a. The molten resin is fed from the molding unit 41 into the open space 46 in the die 43, passes through the central guide hole and the four peripheral holes in the spacer guide 45 for continuous extrusion through the nozzle 43a, and is cooled into a strand. Thus, the four rovings are buried in the resin completely separately from each other. The strand extruded from the nozzle 43a is rapidly cooled by cooling water 5. During the extruding operation, the adhesive is heated for a period of 0.1 to 0.2 second. The strand is collected by the take-off unit 6, and the solidified resin strand is cut by the shearing unit 7 into pellets having a length of 3 to 4 mm.

Figure 3:
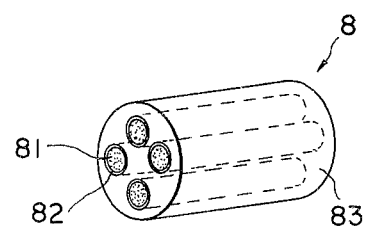
FIG. 3 is a perspective view of the fiber reinforced resin composition according to EXAMPLE 1 of this invention.

The pellets thus obtained contained 30% of glass fibers. One of the pellets is shown in FIG. 3. The pellet 8 comprises four rovings 81 of glass fibers, an adhesive layer 82 surrounding each roving, and a mass of nylon 66 resin 83 enclosing the rovings and the adhesive layers therein.

The pellets were molded by a blend feeder type injection molding machine at a resin temperature of 280° C. into a tensile test specimen conforming to the specifications of ASTM. The molded product was found to have a tensile strength of 2,000 kg/cm$^2$. Despite the use of the tacky epoxy resin as the adhesive in the pellet, there did not occur any leakage of the adhesive resulting in adherence to the outer surface of the pellet. There did not occur any undesirable gathering of the fibers during the injection molding operation. This means that the adhesive did not cure during the extrusion molding operation.

Pellets of the composition known in the art were likewise injection molded. They comprised glass fiber reinforced nylon 66 containing 30% of glass fibers, treated with an aminosilane alone, and not containing any adhesive. The molded product thus obtained was found to have a tensile strength of 1,710 kg/cm$^2$.

EXAMPLE 2

Glass fiber reinforced polybutylene terephthalate pellets were prepared by a process which was substantially identical to that employed in EXAMPLE 1. Polybutylene terephthalate under the trade name TUFPET N1000 of Toyo Spinning-Mitsubishi Rayon was fed into the extrusion molding machine through its hopper, while four adhesive-coated rovings of glass fibers were continuously introduced into the wire coating die, whereby a resin strand was extrusion molded. The strand was cooled immediately, and cut into pellets having a length of 3 to 4 mm. The pellets were molded by an injection molding machine at a resin temperature of 250° C. into a tensile test specimen conforming to the specifications of ASTM. The molded product contained 30% of glass fibers, and had a tensile strength of 1,560 kg/cm$^2$.

Pellets of the composition known in the art were likewise injection molded. They comprised glass fiber reinforced polybutylene terephthalate treated with an aminosilane alone, and not containing any adhesive. The molded product was found to have a tensile strength of 1,340 kg/cm$^2$.

EXAMPLE 3

Rovings of glass fibers having a diameter of 13μ treated with an epoxysilane under the trade name A186 of Dow Chemical and continuously dipped in an adhesive treatment solution comprising 1.0 part by weight of an epoxy resin of the bisphenol A glycidyl ether type under the trade name EPIKOTE 828 of Shell Chemical, 0.26 part by weight of 4,4'-diaminodiphenylmethane and 100 parts by weight of acetone, dried, and introduced into a strand guide in the extrusion molding machine, whereby glass fiber reinforced polybutylene terephthalate pellets were prepared. The pellets were entirely free from any disadvantage due to tackiness, or the like, as had been the case with the pellets obtained in EXAMPLE 1. When the pellets were injection molded, the molded product was free from any disadvantage, such as gathering of the fibers. The molded product containing 30% of glass fibers showed a tensile strength of 1,530 kg/cm$^2$.

For the sake of comparison, pellets of the composition known in the art were likewise injection molded. They comprised glass fiber reinforced polybutylene terephthalate containing 30% of glass fibers, treated with an epoxysilane alone, and not containing any adhesive. The molded product showed a tensile strength of 1,300 kg/cm$^2$.

EXAMPLE 4

Rovings of glass fibers having a diameter of 14μ and treated with an aminosilane under the trade name A1100 of Dow Chemical were continuously dipped in a treating solution comprising 1 part by weight of a novolac resin prepared from phenol formaldehyde in the presence of a concentrated hydrochloric acid catalyst, 0.1 part by weight of hexamethylenetetramine, and 100 parts by weight of acetone, and dried, substantially as described in EXAMPLE 1. Polyoxymethylene under the trade name Duracon M270 of Polyplastics was employed as a thermoplastic resin, whereby glass fiber reinforced polyacetal pellets were prepared. The pellets were injection molded, and evaluated as in EXAMPLE 1. There was not observed any disadvantage such as tackiness of the pellets, or gathering of the fibers. The molded product showed a tensile strength of 1,000 kg/cm$^2$. It contained 20% of glass fibers.

For the sake of comparison, pellets of the composition known in the art were likewise injection molded. They comprised glass fiber reinforced polyacetal containing 20% of glass fibers, treated with an aminosilane alone, and not containing any adhesive. The molded product had a tensile strength of 800 kg/cm$^2$.

EXAMPLE 5

Five grams of a dimer acid modified polyglycidyl ester under the trade name EPIKOTE 871 of Shell Chemical and 0.6 g of diaminodiphenylmethane (reagent of Wako Junyaku) were dissolved in 1,000 ml of acetone to prepare a glass fiber treating solution. Rovings of 2,000 glass fibers each having an average diameter of 13μ, and treated with an aminosilane under the trade name A1100 of Dow Chemical were continuously dipped in the treating solution, dried, and introduced into a crosshead die in an extrusion molding machine. Polybutylene terephthalate under the trade name TUFPET N1000 of Toyo Spinning-Mitsubishi Rayon was supplied through the hopper of the molding machine, and extruded at a resin temperature of 250° C. to coat the roving continuously. The strand thus obtained was cooled rapidly, and cut into pellets.

The pellets were molded by an injection molding machine into a tensile test specimen conforming to the specifications of ASTM. The molding conditions included a cylinder temperature of 230° C. to 250° C., an injection pressure of 700 kg/cm$^2$, and a mold temperature of 60° C. The reinforced thermoplastic polyester molding thus obtained had a very smooth surface, and did not present any defect, including coloration. It had a tensile strength of 1,570 kg/cm$^2$. The molded product contained 30 parts by weight of glass fibers and 0.3 part by weight of epoxy resin per 100 parts by weight of thermoplastic polyester resin.

Glass fiber reinforced polybutylene terephthalate containing glass fiber rovings treated with an aminosilane, but not containing any uncured epoxy resin was likewise injection molded. The molded product showed a tensile strength of 1,340 kg/cm$^2$.

EXAMPLE 6

A treating solution was prepared by dissolving 10 g of bisphenol A glycidyl ether under the trade name EPIKOTE 828 of Shell Chemical and 3.4 g of diaminodiphenylsulfone in 1,000 ml of acetone. The procedures of EXAMPLE 5 were repeated for composite formation, molding and evaluation. The reinforced thermoplastic polyester molding thus obtained showed a tensile strength of 1,560 kg/cm$^2$. It contained 30 parts by weight of glass fibers and 0.5 part by weight of epoxy resin per 100 parts by weight of thermoplastic polyester.

EXAMPLE 7

A treating solution was prepared from 15 g of novolacepoxy resin under the trade name EPIKOTE 154 of Shell Chemical, 2.1 g of diaminodiphenylsulfone, and 1,000 ml of acetone. The procedures of EXAMPLE 5 were repeated for composite formation and injection molding, whereby a reinforced thermoplastic polyester molding was obtained. It had a tensile strength of 1,520 kg/cm$^2$. It contained 30 parts by weight of glass fibers and 0.6 part by weight of epoxy resin per 100 parts by weight of thermoplastic polyester resin.

EXAMPLE 8

A treating solution was prepared by dissolving 10 g of a bisphenol A glycidyl ether type epoxy resin under the trade name EPIKOTE 834 of Shell Chemical and 2.7 g of diaminodiphenylsulfone (reagent of Wako Junyaku) in 1,000 ml of acetone.

Rovings of 2,000 glass fibers each having a diameter of 13μ, and treated with an aminosilane under the trade name A1110 of Dow Chemical were continuously passed through the treating solution, dried, and introduced into the crosshead die of an extrusion molding machine.

Nylon 66 under the trade name LEONA 1300S of Asahi Chemical was introduced through the hopper of the molding machine, and extruded to cover the rovings at a resin temperature of 270° C. The strand thus obtained was cooled rapidly, and cut into pellets. The pellets were molded by an injection molding machine into a tensile test specimen conforming to the specifications of ASTM. The molding conditions included a cylinder temperature of 250° C. to 280° C., an injection pressure of 800 kg/cm$^2$, and a mold temperature of 80° C.

The reinforced polyamide resin molding thus obtained did not reveal any surface defect, such as exposure of glass fibers, but presented a very smooth surface.

The molded product thus obtained was immediately placed in a desiccator, kept at 23° C., and subjected to a tensile test. The tensile test was conducted with a chuck distance of 100 mm and a pull speed of 10 mm/min. by employing an autograph. The product showed a tensile strength of 1,850 kg/cm$^2$. It contained 42 parts by weight of glass fibers and 1 part by weight of epoxy resin per 100 parts by weight of nylon 66.

Glass fiber reinforced nylon 66 containing glass fiber rovings treated with an aminosilane, but not containing any uncured epoxy resin was likewise injection molded. The molded product showed a tensile strength of 1,600 kg/cm$^2$. It contained 43 parts by weight of glass fibers per 100 parts by weight of nylon 66 (and did not contain any epoxy resin).

EXAMPLE 9

A treating solution was prepared by dissolving 10 g of bisphenol A glycidyl ether under the trade name EPIKOTE 828 of Shell Chemical, and 2.6 g of diaminophenylmethane (reagent of Wako Junyaku) in 1,000 ml of acetone.

Glass fiber rovings treated with an aminosilane were continuously dipped in the treating solution, and dried substantially as described in EXAMPLE 8, and were introduced into the crosshead die of an extrusion molding machine. Nylon 6 under the trade name AMILAN 1001N of Toray was introduced through the hopper of the molding machine, and extruded at a resin temperature of 270° C. to cover the rovings. The strand thus formed was cooled rapidly, and cut into pellets. These pellets were molded by an injection molding machine into a tensile test specimen conforming to the specifications of ASTM. The molding conditions included a cylinder temperature of 250° C. to 280° C., an injection pressure of 800 kg/cm$^2$, and a mold temperature of 80° C.

The reinforced polyamide resin molding thus obtained presented a very smooth surface which was free from any surface defect. The molding was subjected to a tensile test as described in EXAMPLE 8. It showed a tensile strength of 1,710 kg/cm$^2$. It contained 42 parts by weight of glass fibers and 0.7 part by weight of epoxy resin per 100 parts by weight of nylon 6.

Nylon 6 containing as the reinforcing material glass fiber rovings treated with an aminosilane alone was likewise injection molded. The molded product showed a tensile strength of 1,550 kg/cm$^2$. It contained 42 parts by weight of glass fibers per 100 parts by weight of nylon 6.

EXAMPLE 10

A treating solution was prepared by dissolving 10 g of a dimer acid modified polyglycidyl ester under the trade name EPIKOTE 871 of Shell Chemical, 3.5 g of methylhimic acid anhydride under the trade name KAYAHARD MCD of Nippon Kayaku and 0.12 g of benzyldimethylamine (reagent of Wako Junyaka) in 1,000 ml of acetone. The procedures of EXAMPLE 9 were repeated, except that the treating solution was changed, whereby pellets were prepared. These pellets were formed into a reinforced polyamide resin molding.

The molding was free from any surface defect, and showed a tensile strength of 1,750 kg/cm$^2$. It contained 42 parts by weight of glass fibers and 1.2 parts by weight of epoxy resin per 100 parts by weight of nylon 6.

EXAMPLE 11

A 300 cc glass reactor was charged with 50 parts by weight of a carboxyl-terminated 1,4-polybutadiene-acrylonitrile copolymer under the trade name CTBN 1,300×13 of Ube Industries, 50 parts by weight of a glycidyl ether type epoxy resin under the trade name EPIKOTE 828 of Shell Chemical and 0.1 part by weight of triphenylphosphine. The contents of the reactor were heated at 130° C. for three hours in oil bath while they were being stirred, and degassed for one hour by a water jet pump, whereby there was obtained an epoxy-terminated 1,4-polybutadiene-acrylonitrile copolymer. Added into 10 parts by weight of the reaction product thus obtained were 2 parts by weight of diaminodiphenylsulfone as a chain extender (crosslinking agent), and 1,000 parts by weight of methyl ethyl ketone as a solvent, whereby a surface treating solution was prepared.

Five rovings spun with a silane coupling agent, a lubricant, etc. were continuously introduced into a stainless steel container holding the treating solution, and dipped therein for about 0.2 second. Each roving was composed of 800 glass fibers having an average diameter of 13μ. The rovings were squeezed by ceramic rollers, and introduced into a drying oven, in which the methyl ethyl ketone was removed. The rovings thus treated were tacky, but were, as they were, introduced into the crosshead die continuously, whereby they were coated with a polyamide resin. The rovings were coated with 1 part by weight of rubber per 100 parts by weight of glass fibers. The extrusion molding machine was set at a cylinder termperature of 260° C., and a crosshead die temperature of 265° C. Nylon 66 under the trade name LEONA 1300S of Asahi Chemical was extruded into the crosshead die at a temperature of 260° C. In order to prevent any curing reaction, control was made to ensure that the rovings be coated in the crosshead die within 0.1 second before being cooled rapidly. The nylon 66 coated rovings were, then, cut into pellets.

The pellets were molded by an injection molding machine into an tensile test specimen conforming to the specifications of ASTM. The molding conditions included a cylinder temperature of 270° C., a mold temperature of 80° C. and n injection pressure of 1,000 kg/cm². The molded product was immediately placed in a silica gel desiccator, and maintained in an absolutely dry condition. The molded product thus obtained presented a smooth surface having no discoloration, and had the glass fibers uniformly distributed therein. It had a glass fiber content of 30.1% as determined by combustion.

The mechanical properties of the molded product were examined at a chuck distance of 100 mm, a pull speed of 10 mm/min. and a temperature of 23° C. It showed a tensile strength of 1,750 kg/cm², an elongation at break of 6.7% and a tensile elastic modulus of 41,000 kg/cm².

For the sake of comparison, rovings each composed of 800 glass fibers having an average diameter of 13μ as used in EXAMPLE 11 were not treated in accordance with this invention, but were merely dried. They were introduced into the crosshead die, and coated with nylon 66. The procedures of EXAMPLE 11 were thereafter repeated for composite formation, molding and evaluation. The test specimen presented a smooth appearance comparable to the product of EXAMPLE 11, and ahd a glass fiber content of 30.4% by weight. The molded product showed a tensile strength of 1,710 kg/cm², an elongation at break of 4.5% and a tensile elastic modulus of 42,000 kg/cm².

EXAMPLE 12

A treating solution was prepared by incorporating 1 part by weight of a glycidyl ether type epoxy resin under the trade name EPIKOTE 834 of Shell Chemical as a chain extender, 0.01 part by weight of benzyldimethylamine as a catalyst and 1,000 parts by weight of methyl ethyl ketone as a solvent into 10 parts by weight of an epoxy- and carboxyl-terminated liquid chloroprene rubber under the trade name DENKA LCR-CE of Denki Kagaku as a rubber oligomer.

Glass rovings were treated with this treating solution, as described in EXAMPLE 11. The rovings were coated with 1 part by weight of rubber per 100 parts by weight of glass fibers. The glass rovings were continuously introduced into the crosshead die, coated with nylon 6 under the trade name AMILAN 1001N of Toray, cooled rapidly, and cut into pellets continuously, as described in EXAMPLE 11. The extrusion molding machine, in which the rovings were coated with nylon 6, had been set at a cylinder temperature of 240° C. and a crosshead die temperature of 245° C.

The pellets were molded as described in EXAMPLE 11. The molding conditions included a cylinder temperature of 240° C., a mold temperature of 80° C., and an injection pressure of 1,000 kg/cm². The molded product presented a smooth surface having no discoloration, and had the glass fibers uniformly distributed therein. It had a glass fiber content of 30% by weight as determined by combustion. The mechanical properties of the molded product included a tensile strength of 1,620 kg/cm², an elongation at break of 7.0% and a tensile elastic modulus of 37,000 kg/cm².

For the sake of comparison, glass rovings not treated with any rubber solution were introduced into the crosshead die, coated with nylon 6, and cut into pellets. The pellets were molded as hereinabove described. The molded product presented a smooth appearance, and had the glass fibers uniformly distributed therein. It had a glass fiber content of 30.2% by weight. It showed a tensile strength of 1,650 kg/cm², an elongation at break of 5.2%, and a tensile elastic modulus of 39,000 kg/cm².

Having now fully described the invention, it will be apparent to one of ordinary skill in the art that many changes and modifications can be made without departing from the spirit or scope of the invention as set forth herein.

What is claimed as new and desired to be secured by Letters Patent of the United States is:

1. A method for producing a fiber reinforced thermoplastic resin composite material for molding, which comprises the steps of:
   applying an uncured, thermally curable resin continuously to the surfaces of reinforcing glass fibers in the form of rovings;
   successively introducing said rovings through a strand guide into a thermoplastic resin in an extrusion molding machine to extrusion mold a resin strand comprising said thermoplastic resin in which said rovings are axially buried;
   immediately cooling said resin strand for minimizing reaction of said uncured, thermally curable resin; and
   cutting said resin strand into pellets, thereby allowing said thermally curable resin to remain uncured, and allowing said thermally curable resin to be cured, when molded, simultaneously with a dispersion of said glass fibers to provide a molded product having high mechanical strength due to a strong chemical bond between said glass fibers and said thermoplastic resin via said thermally curable resin.

2. A method according to claim 1, wherein said rovings entering said strand guide leave an outlet of said extrusion molding machine within one second.

3. A method according to claim 2, wherein said rovings entering said strand guide leave an outlet of said extrusion molding machine within 0.2 second.

4. A method according to claim 1, wherein said thermally curable resin comprises a thermosetting resin.

5. A method according to claim 4, wherein said thermosetting resin is a member selected from the group consisting of epoxy, urethane, polyester, melamine and phenolic resins.

6. A method according to claim 1, wherein said thermally curable resin comprises a thermally curable rubber.

7. A method according to claim 1, wherein said thermoplastic resin is a member selected from the group consisting of polyamide, thermoplastic polyester, polyoxymethylene, polyolefin, ABS and a mixture thereof.

8. A method according to claim 1, wherein said resin strand is immediately cooled by cooling water.

* * * * *